A. J. Shunk.
Horse Rake
No. 90,592. Patented May 25, 1869.
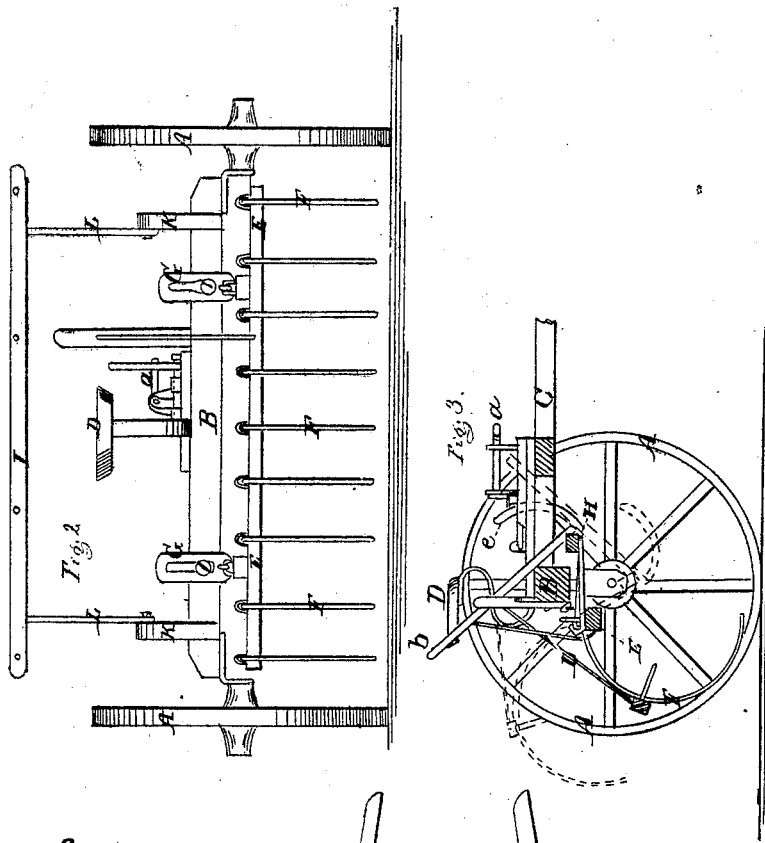
A. J. Shunk
Inventor
Attest
B. H. Sprague
C. F. Clausen
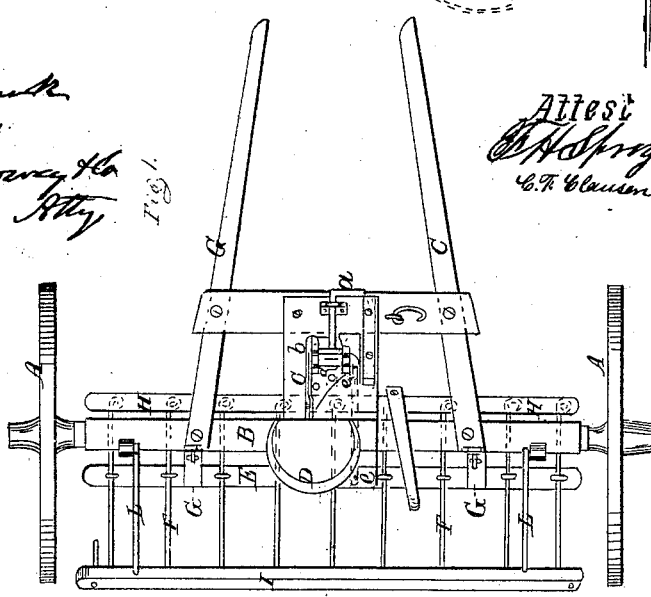

UNITED STATES PATENT OFFICE.

A. J. SHUNK, OF MILLERSBURG, OHIO.

IMPROVEMENT IN HORSE-RAKES.

Specification forming part of Letters Patent No. 90,592, dated May 25, 1869.

*To all whom it may concern:*

Be it known that I, A. J. SHUNK, of Millersburg, in the county of Holmes and State of Ohio, have invented a new and useful Improvement in Horse-Rakes; and I do hereby declare that the following is a full, clear, and exact description of the same, reference being had to the annexed drawings, making part of this specification, in which—

Figure 1 is a plan view of a horse-rake with my improvements attached thereto. Fig. 2 is a rear-end elevation, and Fig. 3 is a side elevation, of the same.

Similar letters of reference denote similar parts in all of the figures.

This invention relates to an improvement in what are termed "horse hay-rakes;" and it consists in the combination and arrangement of devices for suspending the rake beneath the axle of the carriage upon which it is carried.

It further consists in a combination of devices by which the rake may be raised and lowered with reference to the axle; and, further, in a device for locking or retaining the rake in position when in use, as will be more fully described hereafter.

A in the drawings represents the wheels of the carriage upon which the rake is carried. B is the axle of the same, and C C are the shafts. D is the seat, upon which the operator sits when the machine is in use.

All of the devices above named may be of the usual or of any approved construction; but, as they form no part of my present invention, they need not be more fully described here.

E is a bar, which extends across the machine, and which constitutes a portion of the rake, it being provided upon its upper surface with staples, through which the fingers or teeth of the rake pass, for the purpose of preventing them from being pressed apart to such an extent as to permit of the hay passing between them. F F are teeth or fingers, which are to be made of steel, iron, or other suitable material, and which are to be formed with eyes or loops in their upper ends, through which bolts or screws pass for the purpose of securing them to the swinging cross-bar or rake-head H. G G are adjustable hinges, which are provided with vertical slots in that portion thereof which is bolted to the axle of the carriage, the lower portion thereof being secured to the rake, as shown in Figs. 1 and 2. The object of these adjustable hinges is to provide the means of raising and lowering the rake, to cause it to accommodate itself to the different conditions of the grass and of the ground over which it passes.

H is the rake-head or cross-bar, to which the teeth of the rake are secured, it being secured to the axle by means of the adjustable hinges, and arranged, with reference to said axle, in such a manner as to swing freely underneath the same, so that, when it becomes necessary to tilt said rake for the purpose of unloading it, it shall not come in contact with the axle. I is a cross-bar, which is hinged to the uprights K, which are secured to the axle. Said cross-bar is provided with teeth, which pass between those of the rake for the purpose of insuring the removal of the hay or grass therefrom when said rake is tilted for the purpose of unloading the same.

L L are the hinges to the cross-bar above referred to. $a$ is a crank, which is secured within bearings formed upon a frame-work of iron or any other suitable material, which is placed convenient to the driver's seat, so that with the foot of the driver the crank may be operated to force back the bolt or catch $b$, which secures the segmental lever $e$ in position, and thus allow the rake to tilt for the purpose of unloading the same. $b$ is a bolt or catch, which is operated by an arm upon the inner end of the crank-shaft, and which is so arranged with reference thereto that, when the crank $a$ is depressed, the bolt or catch will be withdrawn, and thus allow the segmental lever to pass it. $c$ is a spring, which is so arranged as to bear upon the outer end of the bolt $b$, for the purpose of returning the same to its original position when the pressure upon the crank $a$ has been removed. $e$ is a segmental lever, which is secured to the bar E of the rake, and is so curved and arranged as to pass up through the frame $d$, and just in the rear of the bolt $b$, and is for the purpose of holding the rake in position when the same is in use.

It will be seen, upon reference to the drawings, that whenever the operator desires to unload his rake he has only to press upon the crank $a$ with his foot, when the bolt $b$ will be withdrawn, and the lever e will be at liberty to pass the same, and allow the rake to be so far rotated upon its adjustable hinges as to permit of the ready unloading of the same, after which, if the foot is removed from crank a, (the rake having been previously returned to its working position by means of the hand-lever f,) the spring c will return the bolt b to its position in rear of said lever, and thus retain the rake in position until another load is collected.

Having thus described my invention, what I claim, and desire to secure by Letters Patent, is—

1. The combination and arrangement of the crank a, bolt or catch b, and lever e, substantially as shown and described.

2. The combination and arrangement of crank a, bolt or catch b, and a lever for tilting the rake, with and in reference to the uprights K, hinges L, and cross-bar I, all substantially as and for the purpose set forth.

In testimony whereof I have signed my name to this specification in the presence of two subscribing witnesses.

A. J. SHUNK.

Witnesses:
P. M. CASADY,
CHS. D. H. PARKER.